(12) United States Patent  
Cadden (10) Patent No.: US 6,219,767 B1  
(45) Date of Patent: *Apr. 17, 2001

(54) SYSTEM FOR RECORD-BASED BACKWARD SKIPPING WITHIN PHYSICAL BLOCKS OF DATA

(75) Inventor: William S. Cadden, Saugerties, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/139,091

(22) Filed: Aug. 24, 1998

(51) Int. Cl.[7] .................................................. G06F 12/00
(52) U.S. Cl. ............................................ 711/154; 711/111
(58) Field of Search ................................... 711/111, 219, 711/129, 154

(56) References Cited

U.S. PATENT DOCUMENTS

| | | | |
|---|---|---|---|
| 3,585,601 | 6/1971 | Lahrson et al. ...................... | 709/101 |
| 4,228,471 | 10/1980 | Shiga ................................. | 360/73.06 |
| 4,811,131 | 3/1989 | Sander et al. ...................... | 360/74.4 |
| 5,101,494 | * 3/1992 | Bilski et al. ....................... | 395/704 |
| 5,287,478 | * 2/1994 | Johnston et al. .................... | 711/111 |
| 5,442,390 | 8/1995 | Hooper et al. ...................... | 348/7 |
| 5,829,004 | * 10/1998 | Au .................................. | 707/100 |

FOREIGN PATENT DOCUMENTS 57-12407    1/1982   (JP).

* cited by examiner

Primary Examiner—Matthew Kim  
Assistant Examiner—Matthew D. Anderson  
(74) Attorney, Agent, or Firm—Floyd A. Gonzalez, Esq.; Heslin & Rothenberg, P.C.

(57) ABSTRACT

Record-based backward skipping is provided for accessing logical records contained within physical blocks of data of a storage medium. A computing unit coupled to the storage medium reads a current block of data from the storage medium and determines a number of logical records within the current block, as well as the location of each logical record. The number of logical records is then employed to determine whether the desired logical record is within the current block, and if so, a pointer is provided to the desired logical record for skipping back to that record. If the desired logical record is not within the current block, then a previous block is read from the storage medium and the process is repeated to determine whether the desired logical record is within the new block.

7 Claims, 7 Drawing Sheets fig. 1 fig. 2 fig. 3 fig. 4 fig. 5 fig. 6 fig. 7 fig. 8 fig. 9

SYSTEM FOR RECORD-BASED BACKWARD SKIPPING WITHIN PHYSICAL BLOCKS OF DATA

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"METHOD FOR RECORD-BASED BACKWARD SKIPPING WITHIN PHYSICAL BLOCKS OF DATA," by William S. Cadden, U.S. Ser. No. 09/139,068, (Docket No. PO9-97-147); and "RECORD-BASED BACKWARD SKIPPING WITHIN PHYSICAL BLOCKS OF DATA," by William S. Cadden, U.S. Ser. No. 09/138,710, (Docket No. PO9-98-143).

TECHNICAL FIELD

The present invention relates to mass storage of computer systems. More particularly, the invention relates to backward skipping of logical records of one or more physical blocks of a storage medium.

BACKGROUND OF THE INVENTION

A wide variety of computer systems employ an ability to write data to and read from a remote storage medium, which can provide a number of system advantages. For example, in a distributed client/server storage environment, the ability to write data to a remote storage medium allows an application program to use hardware that is associated with processors other than the one the application program is running on.

One difficulty in accessing data from a storage medium arises from the difference between blocks which comprise a physical expression of data in the storage medium and records which are a logical expression of the data. Within a given block, there may only comprise a part of a record (herein referred to as a "segment"), an entire record or multiple records. The ability to access storage medium data by moving backward through the blocks of a tape is readily provided because blocks are the physical storage unit on the storage medium, such as a direct access storage device (DASD). If, however, an application program on a computing node coupled to the storage medium wishes to skip access records of the file rather than blocks, there is no convenient technique for accomplishing this. Again, there may be several records per block, or in the case of variable blocked spanned (VBS) format records, a logical record may be spread out over several physical blocks.

Thus, an enhanced approach to skipping through the physical blocks of a storage medium based upon logical records contained therein is desired, and in particular, a capability for skipping backwards using logical records is needed.

DISCLOSURE OF THE INVENTION

Briefly summarized, the invention comprises in one aspect a system for skipping back to a desired logical record within a physical block of a storage medium. The physical block comprises one block of a plurality of physical blocks within the storage medium. The system includes: means for evaluating a current block to determine a number of logical records within the current block; and means for determining whether the desired logical record is within the current block using the number of records int eh current block, and if so, for providing a pointer to the desired logical record for skipping back to the desired logical record.

In still another aspect, a system is provided for skipping back to a desired logical record within a physical block of a storage medium. The physical block comprises one block of a plurality if physical blocks within the storage medium. The system includes a computing unit coupled to the storage medium and having memory for holding a current block read from the storage medium. The computing unit is adapted to determine a number of logical records in the current block, and to determine whether the desired logical record is within the current block using the number of records in the current block. If the desired logical record is within the current block, then the computing unit is further adapted to provide a pointer to the desired logical record for use in skipping back to the desire logical record. Otherwise, a next previous block is retrieved from the storage medium and the computing unit's evaluating and determining processes are repeated. The retrieval of previous blocks from the storage medium continues until the desired logical record is located within a current block under analysis.

To restate, a record-based capability is provided for skipping backward through a file according to its logical record format rather than its physical format. This capability is useful since records are more likely to reflect the organization of the data than physical blocks of the storage medium. For example, if each record contains information about one client of a company, the capability of the present invention can be used to skip backwards through some number of client records. If physical blocks were used rather than records, the process of finding the client information would be more difficult. Another advantage of the capability of the present invention is that when placed into an application interface, the capability frees the calling application program from knowing the physical layout of the records. The invention will work with a number of different record formats, for example, variable, variable blocked, variable blocked spanned, fixed, and fixed blocked. Thus, an application program can call an API function which uses this invention to skip through records of a number of different formats without the application having knowledge of the formats. This frees the application to concentrate on the logical content of the data rather than its physical layout.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In accordance with the principles of the present invention, a data access capability is provided which enables a computing unit to skip backwards based on logical records within a block of data or among blocks of data. As used herein, a "block" or "block of data" comprises a physical block or unit of storage space within a storage medium associated with the computing node. The "record" is a logical expression of data stored within one or more blocks. In one embodiment, the data access approach of the present invention involves evaluating a current block to determine a number of logical records in the current block, and thereafter, determining whether the desired logical record is within the current block using the number of records within the current block. If the desired logical record is in the current block, then a pointer is provided to that logical record.

Figure 1:
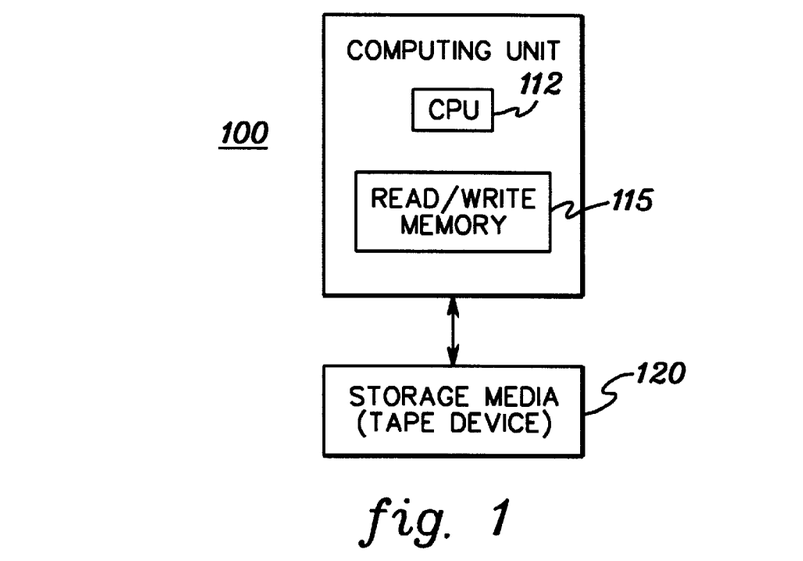
FIG. 1 is a simplified diagram of a data processing system usable with the present invention.

One example of a computer environment incorporating and using the record-based backward skipping capability of the present invention is depicted in FIG. 1. As shown, computer environment 100 includes, for instance, a computing unit 110 having at least one central processing unit 112 and read/write memory 115. As is known, central processing unit 112 is the controlling center of computing unit 110 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 112 employs read/write memory 115 for writing data to and reading data from a storage medium 120. Storage medium 120 may comprise any conventional storage media such as a magnetic storage media (e.g., tape or disk), or direct access storage device, etc. In one example, computer environment 100 is a single system environment, which includes an RS/6000 computer system running an AIX operating system. (RS/6000 and AIX are offered by International Business Machines Corporation). However, the invention is not limited to such an environment. The capabilities of the present invention can be incorporated and used within many types of computer environments and many types of computer systems. For instance, computer environment 100 can include a UNIX workstation running a UNIXbased operating system. Other variations are also possible and considered a part of the claimed invention.

For instance, in another embodiment, the computing unit could comprise a PS/2 offered by International Business Machines Corporation. In a further embodiment, the computing unit could be based upon the Enterprise Systems Architecture offered by International Business Machines Corporation. Further, the operating system need not be UNIX-based or AIX-based. For example, the operating system can include the Multiple Virtual Storage (MVS) operating system offered by International Business Machines Corporation.

In yet a further embodiment, the environment can comprise a large parallel system with a plurality of computing units (for example, 512 nodes) coupled to one another and to the storage device via a network connection, such as a switch. Additionally, in other environments, the units can be of differing types connected to one another via one or more connections. The invention is not limited to a particular number of units coupled together nor to the type of units that are coupled. To restate, a computing unit can include other types of nodes, computers, processors, systems, workstations, and/or environments without departing from the spirit of the present invention.

By way of further explanation of the environment, many storage access methods allow a user application to skip forward and backward by physical blocks of data on the storage medium. This blockbased function is provided for files because blocks are the physical storage unit on a typical storage medium, such as a tape. By way of example, skipping forward and backward through blocks of a tape are capabilities documented in an International Business Machines Corporation publication entitled "IBM Network Tape Access and Control System for AIX and IBM NetTape Tape Library Connections User's Guide and Reference", NetTape User Guide, Release 1.1, Fourth Edition (August, 1996), and an International Business Machines Corporation publication entitled "IBM Network Tape Access and Control System for AIX and IBM NetTape Tape Library Connections User's Guide and Reference", NetTape User Guide, Release 1.2, Fifth Edition (August, 1997), the entirety of both of which are hereby incorporated herein by reference. In both these publications, a function call ("ctpskpr") is provided to skip forward or backward some number of physical blocks in a tape file.

Figure 2:
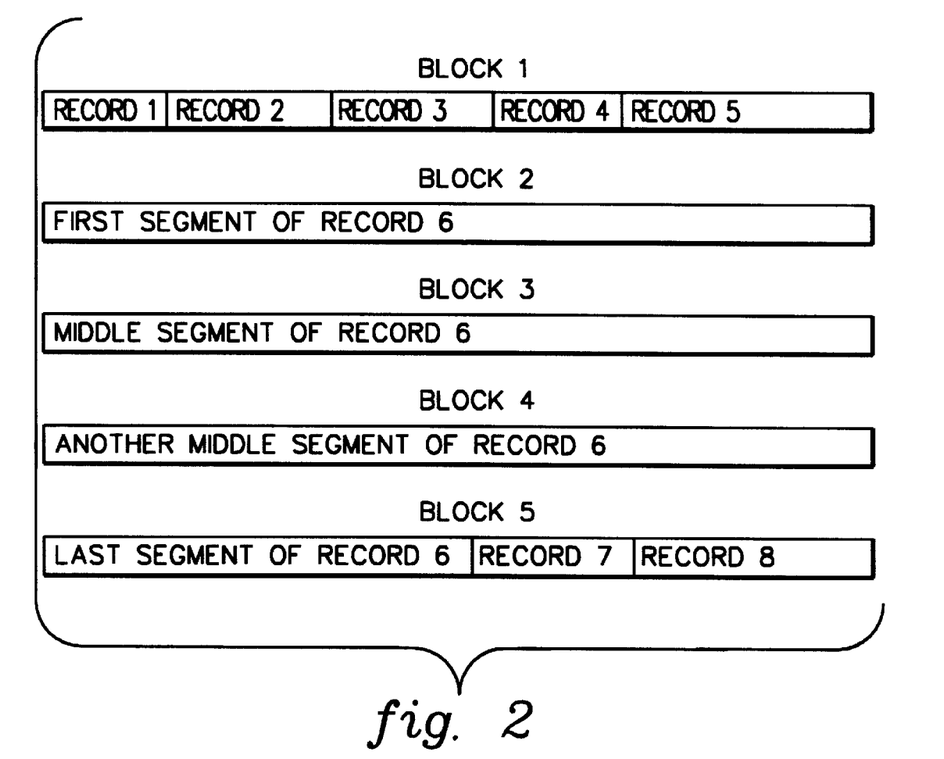
FIG. 2 is a block diagram of one example of a file saved to a storage medium.

Existing algorithms are thus useful for skipping backwards based on physical blocks of a storage medium, but are generally unable to do record-based backward skipping. As shown in FIG. 2, there may be several logical records per physical block, only one record per block, or only a segment of a record for an entire physical block. For example, record 6 is shown to have a first segment in block 2, a middle segment in block 3, another middle segment in block 4, and a last segment in block 5.

Access methods exist which read logical records from blocks while moving in a forward direction, so skipping forward is relatively straightforward. In order to implement a record-based forward skip, all that needs to be done is to read forward, ignoring records until the required number of records has been skipped. Skipping backwards, however, is not so trivial. Described hereinbelow is a technique in accordance with the present invention for skipping backward through the blocks of a file, understanding the records that are within each block, until the required number of logical records has been skipped, thereby providing a record-based backward skip.

Figure 3:
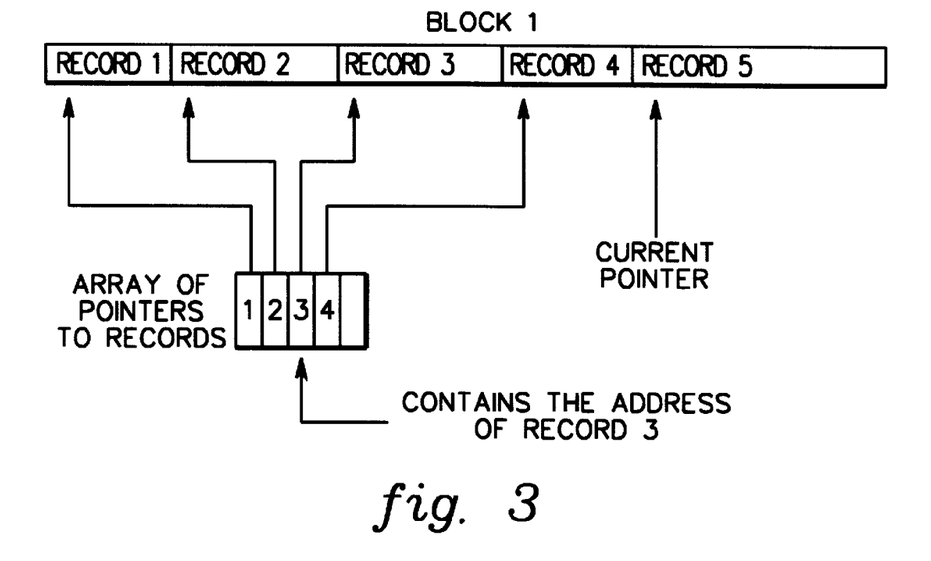
FIG. 3 is a block diagram of an array of pointers employed by a computing unit when reading a block of data from the storage medium into the read/write memory of FIG. 1.

In one implementation of the backward skipping capability of the present invention, an array of pointers to records is used for a current block under analysis. FIG. 3 depicts such an array wherein each element (or slot) of the array of pointers points to the beginning address of a different record in the current block of data, which, for example, has been read from the main storage medium into local memory within the computing unit. A first slot in the array of pointers points to the beginning of record 1, a second slot to the beginning of record 2, a third slot to the beginning of record 3 and a fourth slot to the beginning of record 4. In this example, a current pointer is shown to record 5.

The array of pointers needs to be large enough to accommodate the maximum number of logical records in the block. If a block comprises 32 kilobytes of data, and each record needs to be at least 4 bytes long, then the array of pointers to records needs to be able to handle up to 8 kilobytes of records. As described further below, the array of pointers is assembled by traversing segments from the beginning to the end of a block. As the start of each record in the block is located, the array of pointers to records is updated with a pointer to that record.

Figure 4:
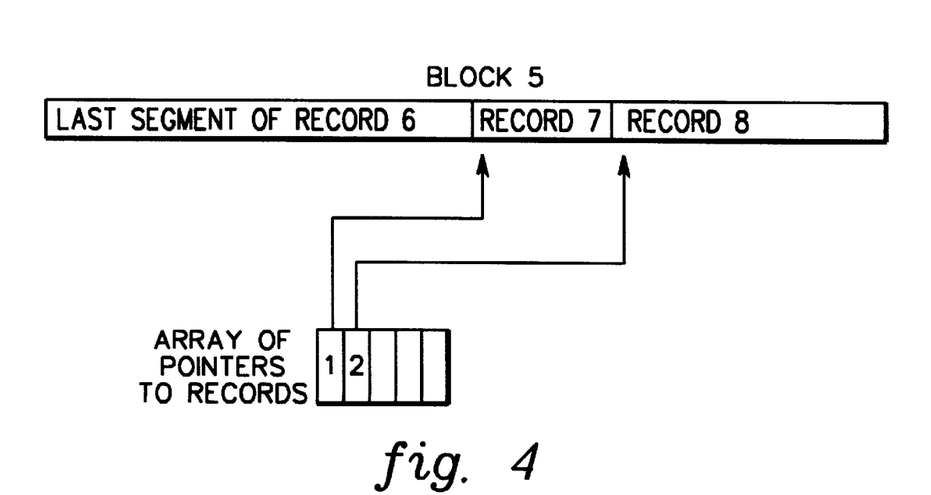
FIG. 4 is a diagram of block 5 of FIG. 2 showing creation of the array of pointers to records.

Once assembled, the record-based skipping capability of the present invention employs the array of pointers to records to accomplish the backwards skip. For example, each current block is searched and the array of pointers is set up to point to the various records in that block. If the record being skipped back to is within the current block, its address is directly indexed within the array of pointers. By way of example, if the current record is record 5 of FIG. 3, and it is desired to skip two records backwards so that processing accesses record 3, the address of record 3 is directly available from the array of pointers to records. Note that special care needs to be taken when dealing with segments of VBS records. As shown in FIG. 4, only the segments which start a record are pointed to. Even though the last part of record 6 is within block 5, the segment is not treated as a record.

If the record being skipped back to is not within the current block, preceding blocks in the storage medium must be read until the correct block is found. For example, assume that record 7 of FIG. 2 is the current record and it is desired to skip back three records. To accomplish this, blocks 4, 3, 2 and 1 will be checked (pursuant to the present invention) before record 4 is found and an address is identified which may be used for the backwards skip from record 7.

Figure 5:
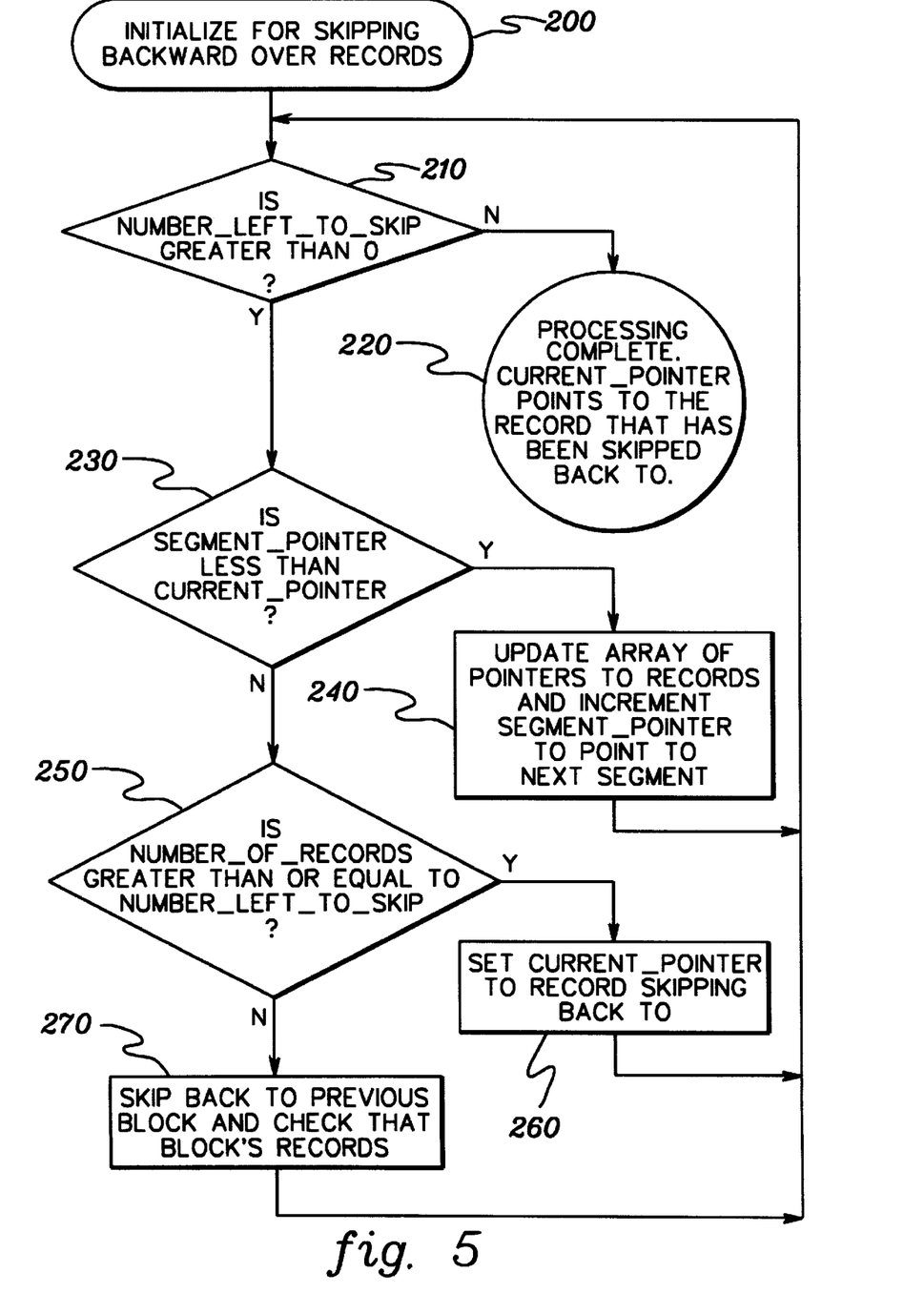
FIG. 5 is a flowchart of one embodiment of a record-based process for skipping back to a desired logical record of a physical block of a storage medium in accordance with the principles of the present invention.
Figure 6:
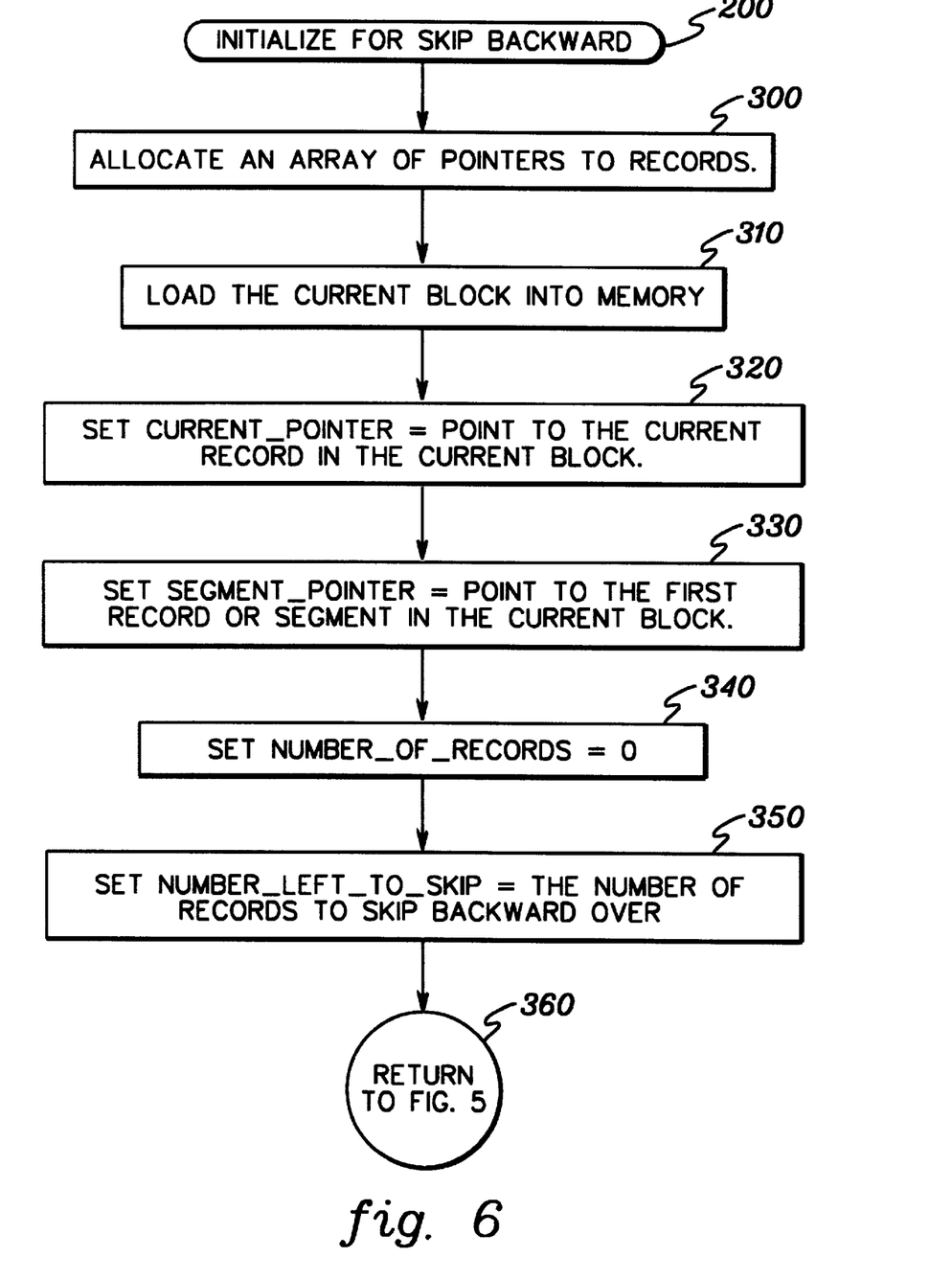
FIG. 6 is a flowchart of one embodiment of the initialization step of FIG. 5.

FIG. 5 depicts one embodiment of skip backwards processing in accordance with the present invention. Processing begins by initializing for the backward skip 200. One embodiment of this initialization process is depicted in FIG. 6. After calling for initialization 200, processing allocates an array of pointers to records for the current block read from the storage medium 300. Again, this array must be as large as the maximum number of logical records within a single physical block of storage. As one example, the array of pointers to records is allocated in memory within the computing unit. Next, a current block is loaded into the read/write memory of the computing unit 310, and a variable "current_pointer" is set to point to a current record in the current block 320. Skipping backward occurs from the record pointed to by current_pointer.

Next, a "segment_pointer" is defined to point to the first record or segment in the current block read from the storage medium 330. This segment_pointer is employed to loop through the block and count the records before the current pointer. A "number_of_records" variable, which is a count of how many records are in the current block, is initialized to zero 340, and finally, a "number_left_to_skip" variable is initialized with the number of records to skip backwards over 350. For example, if the current record is record 7, and the desired record is record 4, then the number_left_to_skip is 3. Note although blocks are read backwards from the storage medium from a current block to a next previous block, processing within a block is forward from a beginning segment to an ending segment of the block. This forward processing of segments within the blocks, which allows pointers to each record to be assigned, is a limitation imposed by the physical layout of the block itself, i.e., processing necessarily starts at the beginning of a block and moves forward within the current block. After setting the number_left_to_skip variable, processing returns to the main flow of FIG. 5.

Figure 7:
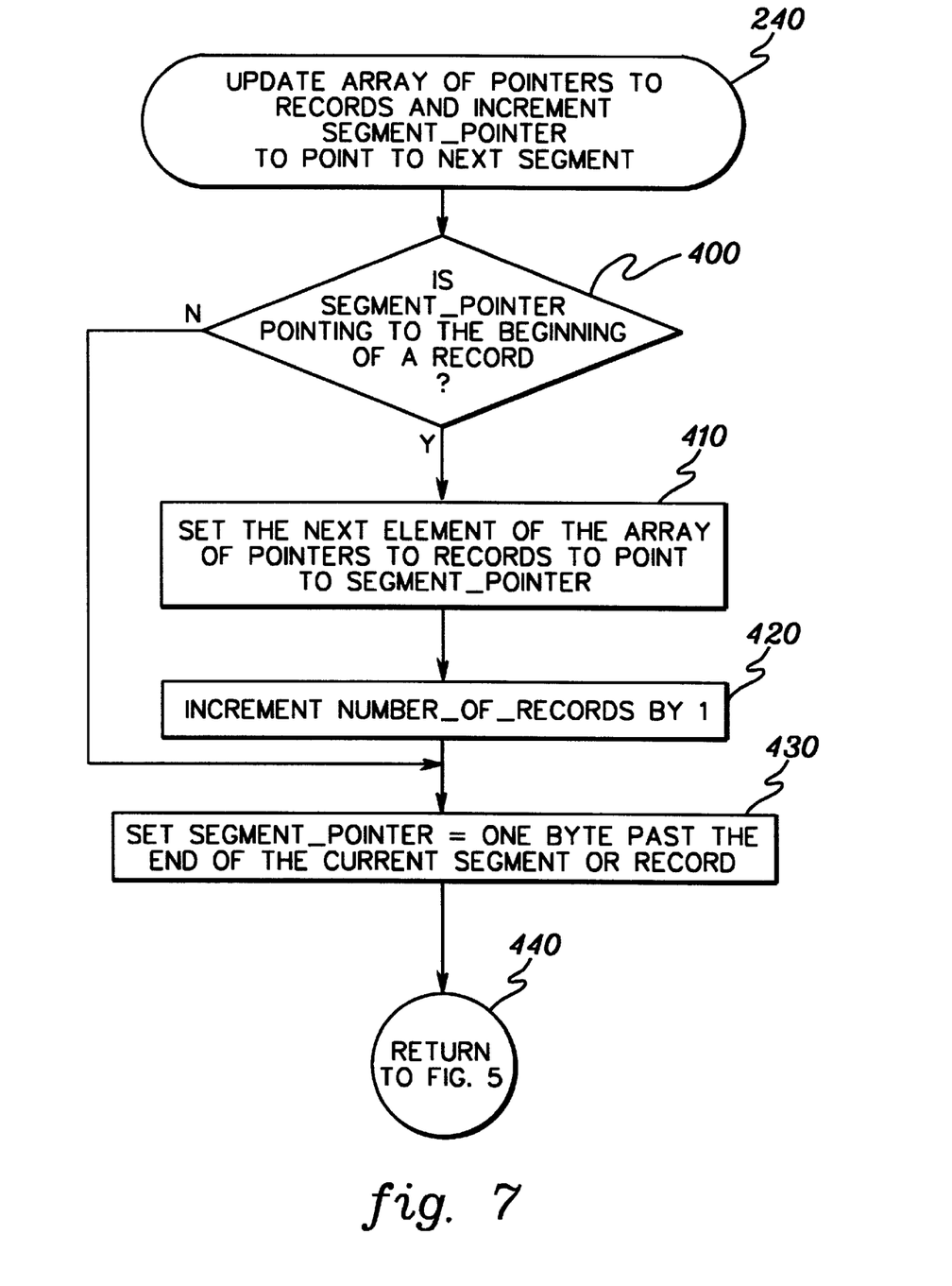
FIG. 7 is a flowchart of one embodiment of the update array of pointers to records and increment segment_pointer to point to next segment step of FIG. 5.

As shown in FIG. 5, after initialization processing determines whether the number_left_to_skip variable is greater than zero 210. If "no", then processing is complete and the current_pointer points to the record that has been skipped back to 220. Assuming that more records remain to be skipped over, then processing determines whether the segment pointer is less than the current_pointer 230. If "yes", the array of pointers to records is updated and the segment_pointer is incremented to point to the next segment in the current block 240. FIG. 7 depicts one example of this processing.

As shown in FIG. 7, processing to update the array of pointers to records and increment the segment_pointer to point to next segment 240 initially determines whether the segment_pointer is pointing to the beginning of a record 400. If "no", then the segment_pointer is pointing to a segment, and since only records receive pointers in the array of pointers, no action needs to be taken other than incrementing the segment_pointer to point to the next segment 430. Thereafter, processing returns to the point of call of FIG. 5 440.

If segment_pointer is pointing to the beginning of a record, then processing sets the next element in the array of pointers to records to point to the segment_pointer position 410, and increments the number_of_records by 1 420. Note that by incrementing the number_of_records with assignment of the pointer, processing is counting the number of logical records in the current block as the segment pointer moves through the block. Next, the segment_pointer is moved to 1 byte past the end of the current segment or record 430. This sets the segment_pointer to point to the beginning of the next record or segment, or in the case of the end of the block, to 1 byte past the end of the block. After updating the segment_pointer, processing returns to point of call in FIG. 5 440.

Figure 8:
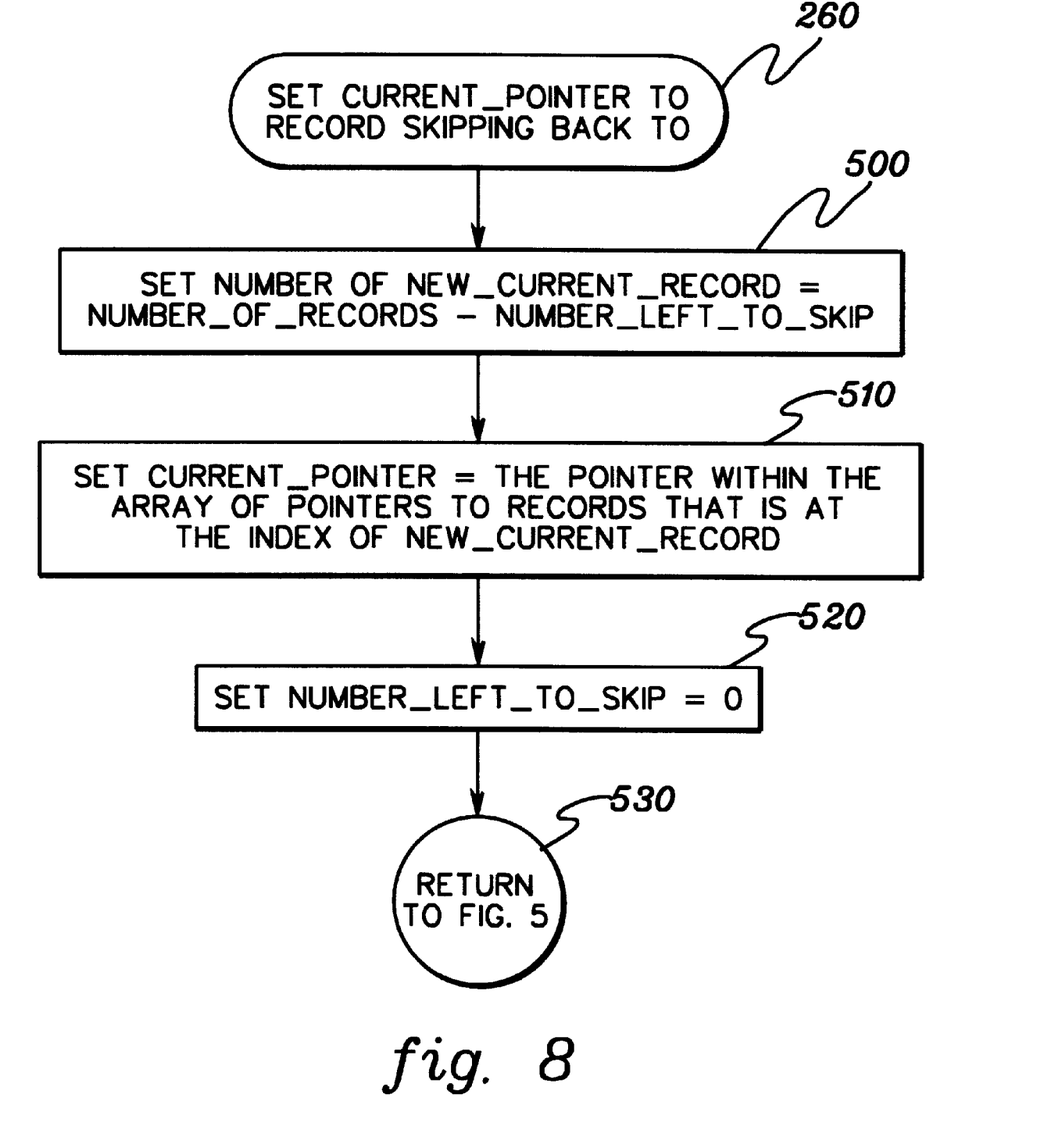
FIG. 8 is a flowchart of one embodiment of the set current_pointer to desired record for skipping back to step of FIG. 5.

Continuing with FIG. 5, if the segment_pointer is not less than the current_pointer, then processing inquires whether the number_of_records is greater than or equal to the number_left_to_skip variable 250. If "yes", then the desired record is within the current block, the index to the desired record is found and the current_pointer is set to that index 260. FIG. 8 depicts one embodiment of this processing. Upon calling this routine 260, a number for new_current_record is calculated as the number_of_records minus the number_left_to_skip 500. For example, referring to FIG. 3, if current_pointer is pointing to record 5 and the desired record is record 3, the number_left_to_skip is 2 and the new_current_record is calculated as 5−2=3. Thereafter, the current_pointer is set to the pointer within the array of pointers to records that is at the index of the new_current_record 510, which sets the current pointer to the desired record to be skipped back to, thereby completing the skip back process. Finally, the number_left_to_skip is reset to zero 520 and processing returns to the point of call of FIG. 5 530. Referring to FIG. 5, from routine 260 processing returns to inquiry 210 and ascertains that the number_left_to_skip is not greater than zero, (i.e., equals zero) and therefore the skip back process is complete 220.

Continuing with FIG. 5, if the number_of_records is not greater than or equal to the number_left_to skip 250, then the skip back process requires access to at least one previous block for the checking of that block's records 270. One embodiment of this process is presented in FIG. 9.

Figure 9:
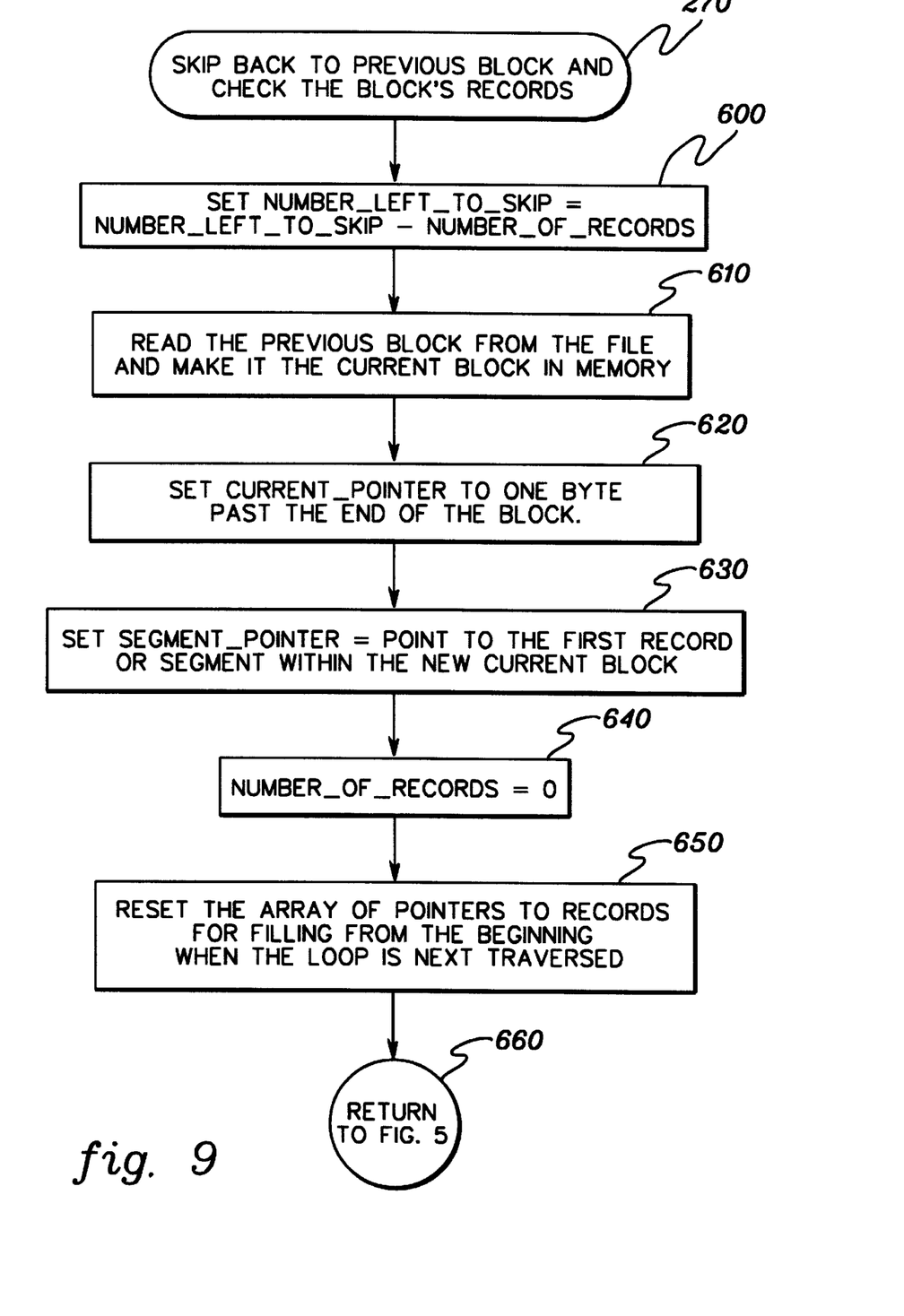
FIG. 9 is a flowchart of one embodiment of the skip back to previous block and check previous block's records for the desired record step of FIG. 5.

As shown, processing 270 begins by setting the number_left_to_skip equal to the number_left_to_skip minus the number_of_records 600. Since the records in the current block are being skipped over, those records are subtracted from the number_left_to_skip variable before reading another block for analysis. Again, processing at this point means the desired record is not within the current block being examined. Therefore, skip back to a previous block is required along with further processing within the loop of FIG. 5.

After adjusting the number_left_to_skip, processing of FIG. 9 reads a previous block from the storage medium and assigns that previous block to be the new current block 610. The current_pointer is then set to 1 byte past the end of the new current block. This pointer will be employed as processing loops through the block as a reference to the end of the block. The segment_pointer is then set to point to the first record or segment within the new current block 630 and the number_of_records is reset to zero 640. Again, the segment_pointer is employed to count the number of records in the new current block as discussed above. The array of pointers to records is then reset for filling from the beginning of the new current block when the main loop is next traversed 650. Processing finally returns to point of call in FIG. 5 660. After initializing the new current block, processing loops back to inquiry 210 for traversal of the new current block as described above. This process of retrieving previous blocks of data from the storage medium is repeated until the block of data containing the desired logical record is obtained.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted, or modified. All these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. A system for skipping back to a desired logical record within a physical block of a storage medium, said physical block comprising one of a plurality of physical blocks of said storage medium, said system comprising:
   means for evaluating a current block to determine a number of logical records in the current block;
   means for determining whether the desired logical record is within the current block using said number of records in the current block, and if so, for providing a pointer to the desired logical record for skipping back to the desired logical record; and
   wherein said means for determining comprises means for evaluating whether the number of logical records in the current block is greater than or equal to a number of logical records left to be skipped before reaching said desired logical record, and if yes, said means for providing comprises means for setting said pointer to the desired logical record within the current block for skipping back to.

2. The system of claim 1, further comprising means for reading a previous block from said storage medium if said means for determining determines said desired logical record is not within said current block, said previous block read from said storage medium comprising a new current block, and means for repeating said means for evaluating and said means for determining for said new current block.

3. The system of claim 2, further comprising means for repeating said means for reading, means for evaluating and means for determining for multiple previous blocks of said storage medium until said desired logical record is located within said new current block.

4. The system of claim 1, wherein said means for evaluating includes means for determining an array of pointers pointing to each logical record in said current block, said pointer to the desired logical record comprising one pointer of said array of pointers when said means for determining determines that said desired logical record is within said current block.

5. The system of claim 4, wherein said means for determining said array of pointers includes means for employing a segment pointer to traverse said current block from a beginning segment of said current block to an ending segment and in so doing identifying a location of each logical record within said current block, each logical record comprising at least one segment.

6. The system of claim 1, further comprising means for reading a previous block from said storage medium if said means for determining determines that said number of logical records left to be skipped is greater than said number of logical records in the current block, wherein said previous block read from said storage medium comprises a new current block, and said system further comprises means for repeating said means for evaluating and said means for determining for said new current block, and wherein said system further comprises means for adjusting said number of logical records left to be skipped prior to said reading of said previous block from said storage medium, said means for adjusting of said number of logical records left to be skipped comprising means for subtracting said number of logical records in the current block from said number of logical records left to be skipped to arrive at a new number of logical records left to be skipped, and wherein said means for determining for said new current block includes means for using said new number of logical records left to be skipped and evaluating whether said desired logical record is within said new current block.

7. A system for skipping back to a desired logical record within a physical block of a storage medium, said physical block comprising one of a plurality of physical blocks of said storage medium, said system comprising:

a computing unit coupled to said storage medium and having memory for holding a current block read from said storage medium, said computing unit being adapted to determine a number of logical records in the current block; and said computing unit being further adapted to determine whether the desired logical record is within the current block using the number of records in the current block, and if so, to provide a pointer to the desired logical record for skipping back to the desired logical record, wherein said computing unit being adapted to determine comprises said computing unit being adapted to evaluate whether the number of logical records in the current block is greater than or equal to a number of logical records left to be skipped before reaching said desired logical record, and if yes, said computing unit being adapted to provide comprises said computing unit being adapted to set said pointer to the desired logical record within the current block for skipping back to.

\* \* \* \* \*